United States Patent
Kuratomi

[15] 3,655,340
[45] Apr. 11, 1972

[54] METHOD OF MANUFACTURING DIAMOND CRYSTALS

[72] Inventor: Tatsuo Kuratomi, 2-18 4-Chome, Hamatake Chigasaki-shi, Kanagawa-ken, Japan

[22] Filed: Aug. 7, 1969

[21] Appl. No.: 848,344

[30] Foreign Application Priority Data

Nov. 27, 1968 Japan............................43/086378

[52] U.S. Cl.................................................23/209.1
[51] Int. Cl. ...............................................C01b 31/06
[58] Field of Search ............................23/209.1, 209.1 D

[56] References Cited

UNITED STATES PATENTS

| | | | |
|---|---|---|---|
| 2,947,609 | 8/1960 | Strong | 23/209.1 |
| 2,992,900 | 7/1961 | Bouenkerk | 23/209.1 |
| 3,148,161 | 9/1964 | Wentorf et al. | 23/209.1 X |
| 3,181,933 | 5/1965 | Wentorf | 23/209.1 |
| 3,268,457 | 8/1966 | Giardini et al. | 252/506 |

FOREIGN PATENTS OR APPLICATIONS 1,049,182  11/1966  Great Britain.......................23/209.1

*Primary Examiner*—Edward J. Meros
*Attorney*—K. W. Brownell

[57] ABSTRACT

Diamond crystals are produced by subjecting to elevated temperatures and pressures a mixture of a nondiamond form of carbon together with a mixture or alloy of nickel and phosphorus, which serves as the solvent and catalyst for the conversion to diamond form. Use of nickel and phosphorus for solvent and catalyst allows conversion of nondiamond carbon to diamond at lower pressures than previously utilized, i.e., from about 38,500 to about 49,000 atmospheres.

5 Claims, No Drawings

METHOD OF MANUFACTURING DIAMOND CRYSTALS

BACKGROUND OF THE INVENTION

This invention relates to a process of producing diamond crystals synthetically. More particularly, this invention relates to a process of producing diamond crystals synthetically by subjecting nondiamond carbon to elevated temperatures and pressures together with a metallic solvent and catalyst.

The synthetic production of diamond crystals has long been of great interest because of the scarcity of natural diamond and the many industrial uses for diamond. In prior art solvent processes, transition metals such as cobalt, nickel, iron, manganese and chromium which form somewhat unstable carbides have been employed as solvent and catalysts for the carbon which is to be transformed into the diamond form.

In all of these solvent processes, two reaction conditions must be satisfied. First, the nondiamond carbon or carbonaceous material must be subjected to pressure and temperature such that diamond is a thermodynamically stable form of carbon. This region is defined for temperatures above about 1,200° K (927° C) by the Berman-Simon line (R. Berman and F. E. Simon, Z. Electrochem. 59, 333–38 (1955)), which states that the minimum pressure necessary for diamond to be thermodynamically stable is defined by $P = 7,000 + 27T$, where $P$ is the pressure in atmospheres and $T$ is the temperature in degrees Kelvin. Below 1,200° K the relationship becomes nonlinear, so that somewhat greater pressures are required.

The second condition to be satisfied is that there must be included solvent and catalyst sufficient to accomplish conversion, and the temperature and pressure must be sufficient for the solvent to melt and for the catalyst to be effective. As a result of this limitation, in combination with the Berman-Simon limitation, prior art processes have in general required a minimum temperature of about 1,200° C, and a minimum pressure of about 50,000 atmospheres.

This limitation is unfortunate, as the attainment of higher pressures reduces the volume of material which can be subjected to a given pressure. Furthermore, the use of higher pressures increases the risk of fracture in the apparatus.

It is, therefore, an object of this invention to provide a process of converting non-diamond carbon to diamond without the necessity of utilizing pressures and temperatures previously required.

SUMMARY OF THE INVENTION

According to the present invention, diamond crystals are produced by subjecting to elevated temperatures and pressures a mixture of nondiamond carbon, nickel and phosphorus; cooling the resultant product; and separating the diamond crystals therefrom. As used herein, "nondiamond carbon" includes not only free carbon such as graphite, charcoal, coke, coal and amorphous carbon, but also chemically bound carbon, i.e., inorganic and organic compounds which decompose to yield free carbon when subjected to the reaction conditions. Although nickel and phosphorus are mentioned separately, it will be clear that both mixtures of nickel and phosphorous as well as alloys containing these metals can be used.

DETAILED DESCRIPTION

It is highly preferred that the nondiamond carbon employed in the process of this invention be free carbon, and graphite is especially preferred. The preferred pressure to be employed is between about 38,500 atmospheres and about 49,000 atmospheres, although higher pressures can be used if desired. The preferred temperature to be employed is between about 880° C and about 1,150° C. Higher temperatures can be used if desired, however. It is preferred to use from about 5 percent to about 16 percent phosphorus in nickel i.e., the ratio of nickel to phosphorus should preferably range from about 19:1 to about 5:1; a ratio of about 16:1 (i.e., about 6 percent phosphorus) is highly preferred. All percentages and ratios herein are by weight, except as noted. The ratio of carbon to nickel preferably ranges from about 2:1 to about 1:1, a ratio of from about 1.25:1 to about 1:1 is most preferred. The process can be carried out in known apparatus which can bear up against temperatures of 1,150° C and pressures of 49,000 atmospheres, for example apparatus of the types disclosed in U.S. Pat. Nos. 2,941,248 and 2,941,252, granted June 21, 1960 to H. T. Hall and H. D. Bovenkirk, respectively; or of my copending U.S. Pat. applications Ser. No. 645,996, filed June 14, 1967 and issued as U.S. Pat. No. 3,492,695, and Ser. No. 767,976, filed Oct. 16, 1968 and now abandoned. It is relatively easy to produce such apparatuses and also to enlarge the capacity of their reaction chambers. Accordingly, the process of this invention can be used in industrial mass production of diamond crystals, which are highly useful as abrasives. The ingredients of nondiamond carbon, nickel and phosphorus are preferably granular or finely divided to permit greater homogeneity in the mixture and thus increase the efficiency of the process.

The invention is further illustrated by the following example.

EXAMPLE

One thousand milligrams of an alloy consisting of 94 percent nickel and 6 percent phosphorus was mixed with 1,000 milligrams of high purity graphite powder. This mixture was subjected to a pressure of about 44,071 atmospheres and a temperature of about 1,100° C. for about 90 minutes. The comparatively long reaction time was utilized to insure sufficient completion of the reaction under the comparatively low pressure and temperature conditions utilized. The apparatus used was of a known type, capable of 1,600° C temperature and 80,000 atmospheres pressure.

After the reaction was completed as described, the pressure was released, the reaction mixture was allowed to cool and 570 milligrams of diamond crystals were recovered.

Although it is not desired to be bound by any theory, ti is believed that under the reaction conditions, a large part of the nickel and all of the phosphorus are melted together to act as the solvent for the process, while a small portion of the nickel remains in the solid state to act as catalyst.

I wish it to be understood that I do not desire to be limited to the exact details shown and described, for obvious modifications will occur to a person skilled in the art.

I claim:

1. A process for producing diamond crystals, comprising the steps of:
   1. subjecting to a temperature between about 880° C and about 1,150° C and a pressure between about 38,500 atmospheres and about 49,000 atmospheres a mixture consisting essentially of nondiamond carbon, nickel and phosphorus in which the ratio of nickel to phosphorus ranges from about 19:1 to about 5:1 and the ratio of carbon to nickel ranges from 2:1 to about 1:1;
   2. cooling the resultant product; and
   3. separating the diamond crystals therefrom.

2. The process of claim 1 in which the pressure employed is about 44,071 atmospheres.

3. The process of claim 2 in which the temperature employed is about 1100° C.

4. The process of claim 3 in which the ratio of nickel to phosphorus is about 16:1.

5. The process of claim 4 in which the ratio of carbon to nickel ranges from about 1.25:1 to about 1:1.

* * * * *